March 10, 1970 P. S. CARTER ET AL 3,500,256

POWER LIMITER COMPRISING A CHAIN OF FERRITE-FILLED DIELECTRIC RESONATORS

Filed Feb. 19, 1968 2 Sheets-Sheet 1

INVENTORS
PHILIP S. CARTER
ROBERT A. CRAIG

BY Paul B. Fike

PATENT AGENT

March 10, 1970 P. S. CARTER ET AL 3,500,256
POWER LIMITER COMPRISING A CHAIN OF FERRITE-FILLED
DIELECTRIC RESONATORS
Filed Feb. 19, 1968 2 Sheets-Sheet 2

INVENTORS
PHILIP S. CARTER
ROBERT A. CRAIG
BY
Paul B. Fike
PATENT AGENT

United States Patent Office
3,500,256
Patented Mar. 10, 1970

3,500,256

POWER LIMITER COMPRISING A CHAIN OF FERRITE-FILLED DIELECTRIC RESONATORS

Philip S. Carter, 221 Iris Way 94303, and Robert A. Craig, 4017 Manzana Lane 94306, both of Palo Alto, Calif.

Continuation-in-part of application Ser. No. 604,488, Dec. 23, 1966. This application Feb. 19, 1968, Ser. No. 712,319
Int. Cl. H04b 3/04
U.S. Cl. 333—17 1 Claim

ABSTRACT OF THE DISCLOSURE

A method of and apparatus for limiting radio frequency power utilizing the absorption properties of ferrite materails wherein one or a series of ferrite spheres are exposed to the radio frequency fields intensified by dielectric materials or equivalent field intensifiers.

Figures 1, 2, 6:
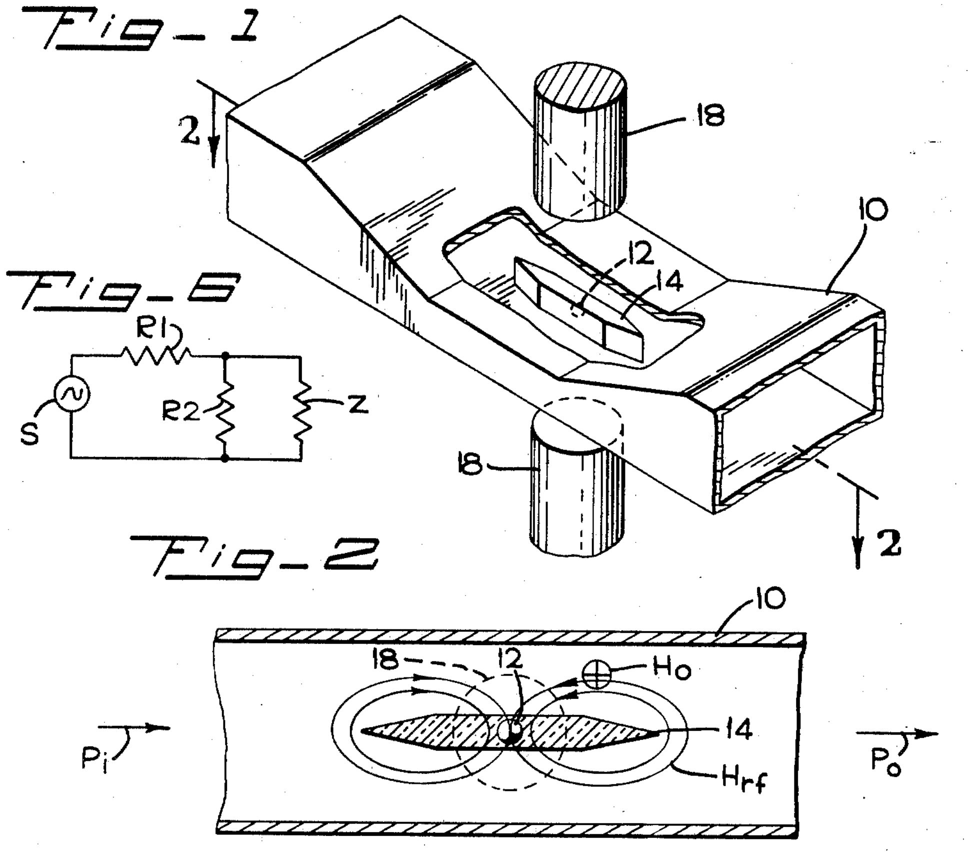

The present invention relates generally to techniques for limiting electrical power and, more particularly, to a method of and apparatus for limiting radio frequency power through utilization of power-absorbing ferrite material. This application constitutes a continuation-in-part of the prior application of Philip S. Carter, Ser. No. 604,488, now abandoned, which, in turn, constitutes a continuation of Carter application Ser. No. 365,989, filed May 8, 1964, now abandoned.

The non-linear power-absorbing characteristics of ferrite materials are well-known albeit incompletely understood. If a particular ferrite, for example, yttrium iron garnet, is exposed to a predetermined direct current magnetic field, a characteristic main resonance is established. If such ferrite is then exposed to magnetic field of radio frequency energy at or near the resonant frequency, considerable absorption of the radio frequency power is experienced above a critical power level determined by the particular ferrite. Since this main resonance is of relatively narrow bandwidth, its utility for power limitation is, of course, restricted. More recently it has been demonstrated that ferrite materials also exhibit subsidiary resonances at high power levels both above and below the main resonance and, although these subsidiary resonances cover broader frequency bands, the amount of absorption is considerably smaller and their utility for power limitation is also restricted. Thus, it would seem that one must choose between relatively good absorption characteristics over a very narrow band of frequencies or relatively poor absorption over a broader band.

It is a general object of the present invention to provide a method of and apparatus for limiting radio frequency power through utilization of a ferrite or ferrites in a manner such that excellent absorption characteristics over a relatively broad frequency band are obtained.

It is a feature of the invention to provide a power limiting method and apparatus wherein the ferrite is biased by an applied direct current magnetic field to a subsidiary resonance and the magnetic radio frequency field is concentrated or intensified whereby excellent absorption of radio frequency power results even at relatively low input power levels.

In accordance with one aspect of the invention, the mentioned intensification of the radio frequency field is achieved in a traveling wave structure by encompassing the ferrite material within a dielectric material having a large dielectric constant.

In accordance with another aspect of the invention, the radio frequency field intensification is achieved by placing the ferrite material within a coupled chain of cavities arranged to intensify the radio frequency field in the region occupied by the ferrite.

Yet more specificallly, a series of ferrite spheres are encompassed respectively in a series of dielectric resonator structures which serve not only to intensify the radio frequency field in the region occupied by each ferrite sphere but also to function as a radio frequency propagating structure.

Another feature of the invention provides for the utilization of two dissimilar ferrites, each of which is exposed to an intensified magnetic radio frequency field, the subsidary resonances of the dissimilar ferrites being arranged in overlapping relationship to thus further extend the absorption bandwidth of the arrangement.

In its most general aspect, the method of the present invention involves transmitting the radio frequency energy whose power is to be limited along a predetermined path within which the ferrite material is disposed and to which ferrite material, a direct current magnetic field has been applied so that the material is biased to a subsidiary ferromagnetic resonance generally in the operating frequency range. The next step of the method is the intensification of the magnetic field of the radio frequency energy in the region occupied by the ferrite so that the ferrite is exposed to an intense and preferably homogeneous field. In accordance with the mentioned characteristics of ferrite materials, but a minor amount of power is absorbed until a critical saturation level or threshold is attained. Above such power level, a large proportion of the power is absorbed, thus ultimately to effect the requisite limitation of the output power transmitted from the limiting ferrite.

Details of the method and exemplary apparatus for carrying out the method together with additional features and advantages thereof can be explained more readily by reference to the accompanying drawing wherein:

FIG. 1 is a fragmentary perspective view of a power limiting arrangement operable at microwave frequencies in accordance with the present invention.

Figure 3:
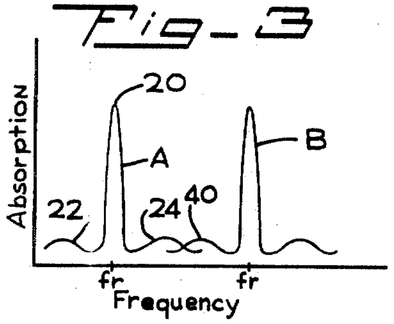
Figure 4:
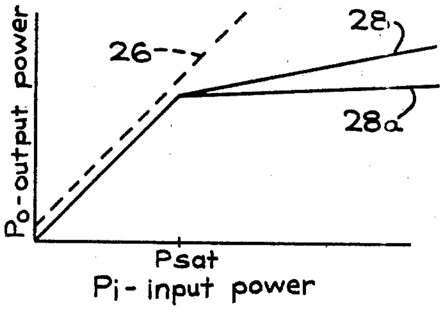
Figure 5:
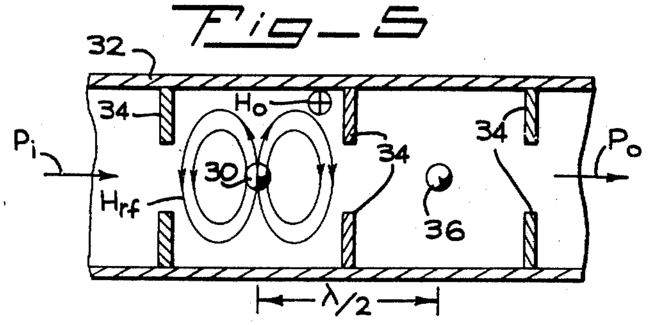
Figure 7:
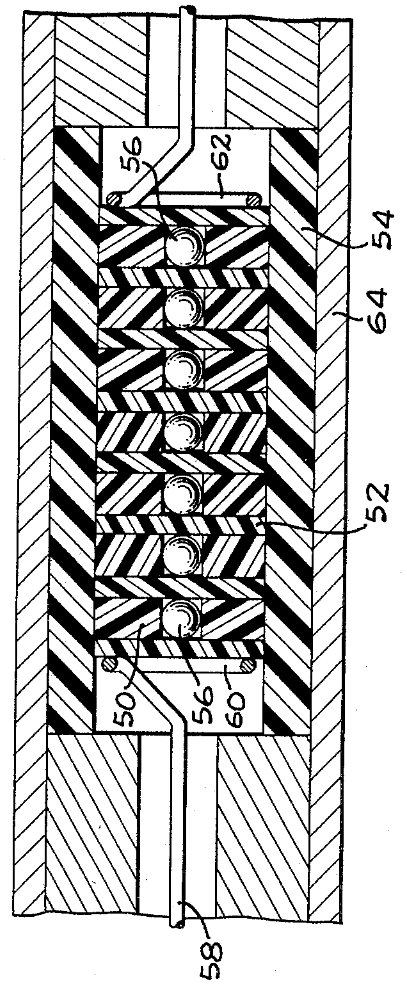

FIG. 2 is a horizontal longitudinal sectional view taken along line 2—2 of FIG. 1 and diagrammatically illustrating the direct current and radio frequency magnetic fields associated with the power limiting operation of the arrangement, FIG. 3 is a graphical illustration of the power absorption characteristics of ferrites at high power levels, FIG. 4 is a graph illustrating the power limiting effects of arrangements according to this invention, FIG. 5 is a fragmentary horizontal longitudinal sectional view generally similar to FIG. 2, but illustrating a modified embodiment of the invention, FIG. 6 is an equivalent circuit diagram explanatory of the operation of the FIG. 5 arrangement, and FIG. 7 is a longitudinal central sectional view generally similar to FIGS. 2 and 5, but illustrating yet another modified embodiment of the invention incorporating a coupled chain of dielectric resonators.

With initial reference to FIG. 1, a portion of a microwave frequency transmission line in the form of a copper waveguide 10 is illustrated. The height of the waveguide 10 is tapered gradually first inwardly and thence outwardly to provide a thin, reflectionless portion whereat the power limiter is mounted.

A small sphere 12 of yttrium iron garnet or other ferrite material is positioned within the thin portion of the waveguide 10 substantially on the central longitudinal axis thereof and is embedded centrally within an elongated rod 14 of dielectric materials disposed on the longitudinal axis of the waveguide and supported between the top and bottom walls thereof. The dielectric rod 14 is composed of a material such as titanium dioxide having a high dielectric constant and is preferably tapered to points at its opposite extremities to preclude reflection of the propagated microwave energy.

The ferrite sphere 12 is immersed in a substantially homogeneous direct current magnetic field that is established between the pole pieces 18 of a magnet positioned above and below the waveguide. With additional reference to FIG. 2, the established direct current field indicated at $H_o$ extends through the ferrite sphere 12 in a direction perpendicular to the plane of drawing. The input microwave power $P_i$ enters the waveguide 10 on the left as viewed in FIG. 2 and the output power $P_o$ exits from the right, and the instantaneous radio frequency magnetic field in the vicinity of the ferrite sphere 12 has substantially the concentric circular configuration indicated at $H_{rf}$, it being observed that the radio frequency magnetic field, as it passes through the ferrite sphere 12, is substantially perpendicular to the applied direct current field $H_o$, such arrangement being generally referred to as "transverse pumping." It is to be expressly noted that the direct current magnetic field and the radio frequency magnetic field can be aligned in the region of the ferrite sphere 12 to provide the so-called "parallel pumping" arrangement which also is operative in accordance with the present invention.

Regardless of the disposition of the radio frequency magnetic field $H_{rf}$ relative to the applied direct current field $H_o$, the dielectric rod 14 encompassing the ferrite sphere 12 serves to intensify the magnetic radio frequency field to accentuate the power limiting action of the arrangement, as will be explained in more detail hereinafter. Since the dielectric rod 14 is composed of material having a high dielectric constant, the electrical impedance is relatively low so that for a given amount of input radio frequency power, higher radio frequency currents are established. Since the magnitude or intensity of the radio frequency magnetic field is directly proportional to the magnitude of the radio frequency currents, the dielectric rod 14 serves to intensify or concentrate the radio frequency magnetic field in the region of the ferrite.

The absorption characteristics of the ferrite material are frequency dependent, as can best be visualized by reference to the curve A shown in FIG. 3 representing the frequency-absorption characteristics at relatively high power levels. Typically, a main ferromagnetic resonance is indicated at 20 by the sharp spiked portion of the curve which accordingly extends over a relatively narrow band of frequencies. On either side of the main resonance peak, subsidiary resonances are indicated at 22 and 24, these having much lower absorption magnitudes but extending over considerably broader frequency bands. For operation in accordance with the present invention, the ferrite and the direct current magnetic field magnitude are selected so that the frequency range of microwave power to be limited lies in the region of one of the subsidiary resonances 22, 24. Thus, the requisite limiting can extend over a rather broad band of frequences. Preferably, a ferrite material is chosen so that the lower subsidiary resonance can be utilized and the required magnitude of the direct current magnetic field is less. It is to be noted that at lower power levels, the so-called subsidiary resonances disappear and substantially no power loss occurs.

When radio frequency power is propagated through the waveguide 10 as described, and intensified radio frequency magnetic fields immerse the ferrite sphere 12 as diagrammatically illustrated in FIG. 2, if such input power $P_i$ is relatively low, but a slight power loss is experienced and the output radio frequency power $P_o$ is but slightly reduced. Such result is best understood by reference to FIG. 4 which graphically illustrates the relationship of the input and output powers. The dotted line 26 on such graph represents the relationship of input power to output power in the case where no ferrite is disposed within the waveguide 10. The solid line curve 28 represents the actual operating relationship, and it will be observed that at low input powers, only a small loss is encountered.

However, the solid line curve 28 has a sharp break when the critical power level is reached at the saturation threshold. Thereafter, considerable absorption takes place and the output power is severely limited. Since the radio frequency magnetic field is intensified in the region occupied by the ferrite sphere, such critical level is reached at relatively low input powers regardless of the fact that the absorption level at the subsidiary resonance is relatively low as previously described in connection with the discussion of the graph of FIG. 3.

Without the discussed intensification of the radio frequency field in the region occupied by the ferrite sphere 12, power limitation at relatively low power levels could be obtained only by considerable reduction of the size of the waveguide. Obviously such reduction is restricted physically by the dimensions of the ferrite sphere which should be made as large as possible to achieve limiting of input powers over a large range of power above the saturation threshold. Furthermore, enlargement of the ferrite would introduce inhomogeniety of the radio frequency magnetic field within which the ferrite was immersed, thus further interfering with its power limiting capabilities.

Thus, a broad-band power limiter capable of limiting power even at relatively low power levels is provided by the arrangement disclosed in FIGS. 1 and 2. Obviously, alternative arrangements can be visualized which would serve to intensify the radio frequency magnetic field in the region of the ferrite and achieve the same overall objective of providing a broad band power limiter. As one example, a ferrite sphere 30 can be centrally positioned within a waveguide 32, as shown in FIG. 5, and the field intensification can be achieved by placing annular metallic partitions 34 within such waveguide, a typical instantaneous radio frequency magnetic field configuration $H_{rf}$ being shown at right angles to an applied direct current magnetic field $H_o$. The partitions 34 form central coupling apertures which are dimensioned so that all frequencies in the desired operating range can be transmitted therethrough in accordance with known design techniques.

In accordance with an extension of the general concept of the present invention, a plurality of the partitions 34, as shown in FIG. 5, can be provided to form a series of coupled cavities, one ferrite sphere 30 being positioned in one cavity, as described, and a second like ferrite sphere 36 being positioned in a second adjacent cavity. The cavity centers are separated by one-half wavelength at the center operating frequency and an electrical phase shift of approximately 90° exists between the ferrite sphere 30 and 36. Since, as in the case of the first embodiment of the invention, the magnitude of the applied direct current magnetic field, $H_o$, is such as to bias the ferrites to subsidiary resonances rather than at their main resonances, the equivalent circuit at high power levels can be simply illustrated, as shown in FIG. 6 wherein $R_1$ represents the predominantly resistive impedance of the first ferrite sphere 30 which is in series with the load, indicated at Z, and is of relatively great magnitude. On the other hand, because of the noted phase shift, the impedance of the second ferrite sphere 36 constitutes a relatively low resistance, $R_2$, in parallel with the load Z whose impedance is of intermediate magnitude. Thus, when input power from the source S increases above the saturation thresholds of the ferrites, the power delivered to the load Z will increase, but at a considerably lesser rate as indicated by the alternate curve **28*a*** in FIG. 4, thus to provide more effective power limitation.

A further modification permits the bandwidth of the power limiter to be greatly enhanced. With continued reference to FIG. 5, the two ferrite spheres 30, 36 are composed of dissimilar materials. A direct current magnetic field is applied to the first ferrite sphere 30 so that the same is biased at a subsidiary resonance above its main resonance, in the manner explained in detail in connection with the first embodiment of the invention. In a generally similar fashion, the second ferrite sphere 36 is immersed in a direct current magnetic field having a value such that it is biased at a subsidiary resonance lying below its main resonance. The ferrite compositions are such that the two subsidiary resonances overlap as will be most clearly understood by reference again to FIG. 3 wherein a second curve B represents the absorption characteristics of the second ferrite 36, the formerly described curve A representing the absorption characteristics of the first ferrite 30. Power limiting is achieved by the first ferrite sphere 30 in the subsidiary resonance region 24 and by the second ferrite sphere 36 in the overlapping subsidiary absorption region 40. The bandwidth of such a power limiter is obviously greatly extended beyond a single ferrite arrangement such as illustrated in FIGS. 1 and 2. As a practical matter, if suitable biasing fields are applied to yttrium iron garnet and to lithium ferrite, excellent power limitation between frequencies of 2 and 3 gigacycles can be provided.

It will be apparent that additional cavities and additional ferrite spheres can be added to the FIG. 5 structure to enhance the limiting action and the ferrites can be of either similar or dissimilar materials to provide the action described hereinabove. Additionally, it will be equally apparent that additional ferrite spheres and dielectric intensifying rods of the type described in FIG. 1 can be added to that structure so that a chain of limiters is provided and each of these can have similar or dissimilar characteristics.

Another modification, as shown in FIG. 7, can be readily envisioned which constitutes essentially a combination of the structures described hereinabove in that it employs dielectric material but specifically in the form of a series of coupled resonators arranged to encompass and intensify the radio frequency fields applied to various spheres positioned therewithin. In this case, the coupled chain of dielectric resonators can function, itself, as the propagating structure so that no surrounding waveguide or other propagating arrangement is required.

More particularly, and with specific reference to FIG. 7, a series of dielectric resonators 50 can take the form of a number of short tubular cylindrical stubs of dielectric material having a high dielectric constant, rutile and strontium titanate being examples of such materials. The cylindrical resonators 50 are separated by spacing slabs 52 of low-dielectric constant material, such as irradiated polyethylene which maintains an equivalent spacing of the dielectric cylinders longitudinally. The dielectric cylinders 50 can, in turn, be encompassed by a single exterior tubular cylinder 54 composed of low dielectric constant material, such as the mentioned irradiated polyethylene. Within each dielectric resonator 50, a ferrite sphere 56 is disposed, being circumferentially encompassed by the surrounding dielectric cylinder 50 and engaged at its opposite poles by the low dielectric constant spacers 52.

Radio frequency energy is introduced to the first dielectric resonator 50 from a coaxial line (not shown) whose central conductor is connected to a wire 58 provided at its extremity with a single turn coil 60 in engagement with the initial dielectric resonator in the chain. Similarly, another coil 62 can be arranged adjacent the last dielectric resonator 50 in the chain for similar coupling to an output coaxial line. The outer conductor of the coaxial line is electrically connected to a hollow cylindrical copper shield 64 that encompasses the entire limiter arrangement to establish electrical continuity with the exterior conductor of the coaxial line and also to provide a shield against stray electric fields existing in the particular environment of the structure.

The dielectric resonators 50, themselves, function as a propagating structure so that the input radio frequency energy passes sequentially therethrough from the input to the output of the limiter structure. Within each dielectric resonator 50, the radio frequency fields are intensified, as discussed in connection particularly with the first embodiment of the invention, so that each ferrite sphere 56 is immersed substantially entirely within a highly intensified radio frequency field, thus to enhance its limiting action.

As in the case of the other embodiments of the invention, a direct current homogeneous field is supplied to the ferrite spheres 56 in a fashion so that they will be biased to their subsidiary resonances. Either similar ferrites or dissimilar ferrites can be utilized and the direct current magnetic field is appropriately adjusted for obtaining the desired bias of the particular ferrite material.

Obviously, yet other modifications and/or extensions of the present invention can be made without departing from the spirit of the present invention; and the foregoing description of several embodiments thereof is to be considered purely exemplary and not in a limiting sense.

What is claimed is:

1. A radio frequency power limiter which comprises,
a plurality of ferrites arranged in aligned relationship to form a cooperating series,
means for propagating radio frequency power consisting solely of a chain of coupled dielectric resonators, each of which encompasses one of said ferrites so as to intensify the radio frequency field therein, and
means for immersing said ferrites in a direct current magnetic field of a magnitude such that said ferrites are biased to subsidiary resonances.

References Cited

UNITED STATES PATENTS

| | | | |
|---|---|---|---|
| 2,920,292 | 1/1960 | Scovil et al. | 333—24.2 X |
| 3,131,366 | 4/1964 | Dixon | 333—24.2 |
| 3,200,353 | 8/1965 | Okwit | 333—24.2 X |

OTHER REFERENCES

Uebele, Characteristics of Ferrite Microwave Limiters, IRE Trans. on MTT, January 1959, pp. 20 and 21 relied on.

Uebele, Characteristics of Ferrite Microwave Limiters, IRE Trans. on MTT, January 1959, p. 19 cited.

HERMAN KARL SAALBACH, Primary Examiner

PAUL L. GENSLER, Assistant Examiner

U.S. Cl. X.R.

333—24.2